(12) United States Patent
Conzachi et al.

(10) Patent No.: US 8,255,112 B2
(45) Date of Patent: Aug. 28, 2012

(54) REMOTE AIRCRAFT MAINTENANCE IN A NETWORKED ENVIRONMENT

(75) Inventors: Keith D. Conzachi, Maple Valley, WA (US); James Farricker, North Bend, WA (US); Todd W. Gould, Marysville, WA (US); Garry Herzberg, Renton, WA (US); Travis S. Reid, Seattle, WA (US); George F. Wilber, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 1810 days.

(21) Appl. No.: 11/419,366

(22) Filed: May 19, 2006

(65) Prior Publication Data

US 2007/0115938 A1   May 24, 2007

Related U.S. Application Data

(60) Provisional application No. 60/731,653, filed on Oct. 28, 2005.

(51) Int. Cl.
- *G06F 19/00* (2006.01)
- *G06F 15/16* (2006.01)
- *G01M 17/00* (2006.01)

(52) U.S. Cl. ............ 701/31.5; 701/31.4; 701/29.1; 701/3; 709/218

(58) Field of Classification Search .......... 701/2, 3, 701/36, 29.1, 31.4, 31.5, 34.4; 709/201, 709/218, 227; 455/431
See application file for complete search history.

(56) References Cited

U.S. PATENT DOCUMENTS

| | | | |
|---|---|---|---|
| 6,671,589 B2 | 12/2003 | Holst et al. | |
| 6,907,416 B2 * | 6/2005 | Tasooji et al. | 706/50 |
| 7,636,568 B2 | 12/2009 | Gould et al. | |
| 2001/0016789 A1 * | 8/2001 | Staiger | 701/1 |
| 2002/0198639 A1 | 12/2002 | Ellis et al. | |
| 2003/0003872 A1 | 1/2003 | Brinkley et al. | |
| 2004/0015418 A1 | 1/2004 | Dooley et al. | |
| 2004/0106404 A1 * | 6/2004 | Gould et al. | 455/431 |
| 2004/0138790 A1 * | 7/2004 | Kapolka et al. | 701/29 |
| 2004/0167689 A1 * | 8/2004 | Bromley et al. | 701/29 |
| 2005/0228558 A1 * | 10/2005 | Valette et al. | 701/33 |
| 2006/0190280 A1 * | 8/2006 | Hoebel et al. | 705/1 |
| 2010/0014537 A1 * | 1/2010 | Jacquet et al. | 370/411 |

OTHER PUBLICATIONS

"Draft Circulation Draft 2 of Project Paper 664: Aircraft Data Network, Part 5—Network Domain Characteristics and Functional Elements" AEEC, Feb. 26, 2004, pp. 1-102.*

PCT International Search Report and Written Opinion for Application No. PCT/US2006/028944, dated Jan. 5, 2007, 12 pages.

* cited by examiner

*Primary Examiner* — Thomas G. Black
*Assistant Examiner* — Christine Behncke
(74) *Attorney, Agent, or Firm* — Caven & Aghevli LLC

(57) ABSTRACT

Remotely performed maintenance of a transportation unit such as an aircraft is disclosed, wherein the maintenance is performed utilizing a networked environment. In one implementation, a first network, located within the mobile transportation unit, is accessed from a second network, located externally to the mobile transportation unit. Having remotely assessed the first network, communication with one or more assets of the mobile transportation unit, which are connected to the first network, is possible. Maintenance operations are then performed by exchanging data and commands with the assets of the mobile transportation unit.

9 Claims, 10 Drawing Sheets

REMOTE AIRCRAFT MAINTENANCE IN A NETWORKED ENVIRONMENT

FIELD OF THE INVENTION

This invention relates to systems and methods for networking assets within an aircraft, and more specifically, to network-based systems and methods that may be used, for example, in manufacturing, operational and maintenance environments.

BACKGROUND OF THE INVENTION

In known systems configured for use within, or that are in communication with, transportation units, device and asset connection have been configured in a point-to-point manner for a limited set of connectivity purposes. In an avionics environment, the emphasis of such point-to-point connections has been airworthiness and airplane safety. Busses and networks configured for such applications have been use-specific, and have not been configured for extensibility and/or dynamic reconfiguration.

For example, known networking tools adapted to transportation units (e.g. aircraft) have tended to serve a single purpose, such as the transmission of maintenance data, or alternatively, the transmission of in-flight data. In a more specific example, during a maintenance period a maintenance device might be attached to a maintenance bus, allowing collection, and perhaps processing, of information from a plurality of devices on the bus. However, the same bus would have little or no use doing the manufacturing process of the transportation unit, and would not provide for connectivity to a wide range of devices or for dynamic reconfiguration during operation.

In such an environment, wherein connections are primarily point-to-point and application-specific, functionality is limited to use in specifically anticipated applications and for similarly anticipated functions. Since it is desirable to provide for the collection, processing and/or transmission of ever-increasing amounts of data, there is a need for improved systems and methods for providing a networked environment within a transportation unit.

SUMMARY OF THE INVENTION

Remotely performed maintenance of a transportation unit such as an aircraft is disclosed, wherein the maintenance is performed utilizing a networked environment. In one implementation, a first network, located within the mobile transportation unit, is accessed from a second network, located externally to the mobile transportation unit. Having remotely assessed the first network, communication with one or more assets of the mobile transportation unit, which are connected to the first network, is possible. Maintenance operations are then performed by exchanging data and commands with the assets of the mobile transportation unit.

BRIEF DESCRIPTION OF THE DRAWINGS

Embodiments of the present invention are described in detail below with reference to the following drawings.

FIGS. 4 through 7 illustrate the flexibility of the teachings herein disclosed by showing alternative embodiments of the network architecture discussed, which represent others not shown but easily envisioned in view of those disclosed, wherein:

FIG. 4 illustrates an example wherein a network architecture according to FIGS. 1-3 or similar is retrofit to an existing core network adapted for a twin aisle implementation;

FIG. 5 illustrates an example wherein a network architecture according to FIGS. 1-3 or similar is retrofit to an existing core network adapted for a Boeing 787 implementation;

FIG. 6 illustrates an example wherein a network architecture according to FIGS. 1-3 or similar is retrofit to an existing core network adapted for a single aisle implementation; and FIG. 7 illustrates an example wherein a network architecture according to FIGS. 1-3 or similar is retrofit to an existing core network adapted to a single LRU implementation.

DETAILED DESCRIPTION

The present invention relates to remote aircraft maintenance in a networked environment. Accordingly, systems and methods are disclosed which provide enhanced functionality for the networked assets in manufacturing, operational and maintenance environments. Many specific details of example embodiments are set forth in the following description and in FIGS. 1 through 10. The example embodiments are representative teachings, and are therefore are not intended as an exhaustive description of all possible embodiments. Accordingly, one skilled in the art will understand that the present invention may have additional embodiments, or that the present invention may be practiced without several of the details, or with different combinations of the details described in the following description.

Figure 1:
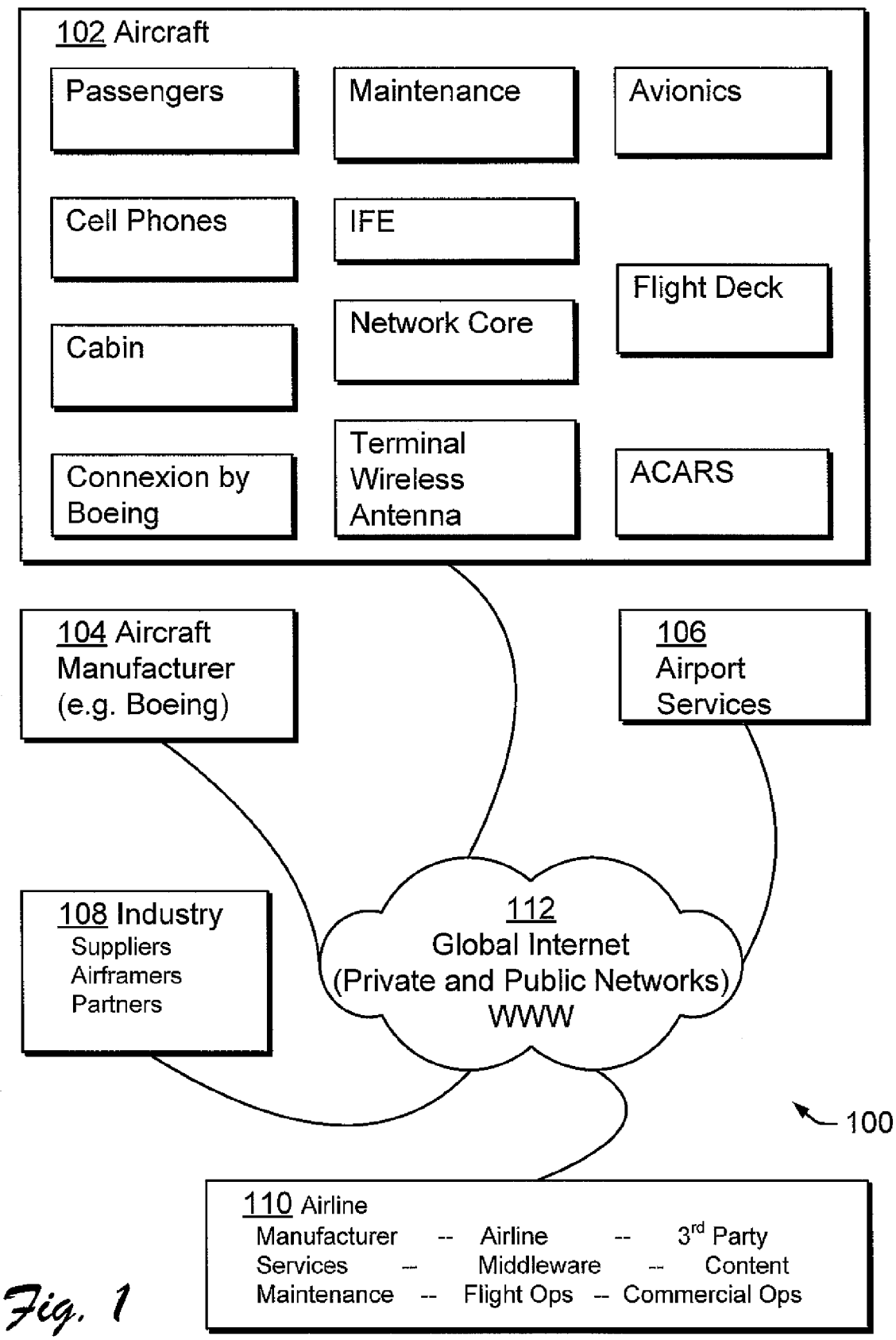
FIG. 1 illustrates an example of a system-level view of a network architecture, wherein the system level view includes a plurality of synergistically interacting systems, in accordance with an embodiment of the invention.

FIG. 1 illustrates an example of a system-level view 100 of a network architecture. More particularly, the view of FIG. 1 is that of a system of systems, within which a plurality of systems interact synergistically. The system of systems is an environment wherein multiple systems, which may operate substantially independently, are also configured to communicate and work together. Such communication results in more capability, particularly in synergistic interaction, than otherwise exists when systems are required to work independently. In an embodiment seen in FIG. 1, the system-level view 100 links an aircraft domains 102, a corporate domains 104 (e.g. Boeing or any other corporation), an airport domains 106, third-party suppliers/vendors/partners 108 and airline domains 110 together through the Internet 112 to share information.

The systems seen in FIG. 1 are representative of systems that vary in application (e.g. utilization), type and complexity. The systems may include on-board avionics systems and sub-systems, as well as ground-based web services and other computing-based applications and services. The example architecture 100 of FIG. 1 provides for the interconnection of the representative systems shown, as well as for the security and protections necessary to link the systems together. The systems of the representative architecture 100 of FIG. 1 can include both safety critical and non-safety critical systems, as well as systems that include business security-related concerns. The systems of FIG. 1 may be built by various entities including, for example, aircraft manufacturer business units, aircraft manufacturer suppliers, third party organizations, airlines, or web service providers.

Figure 2:
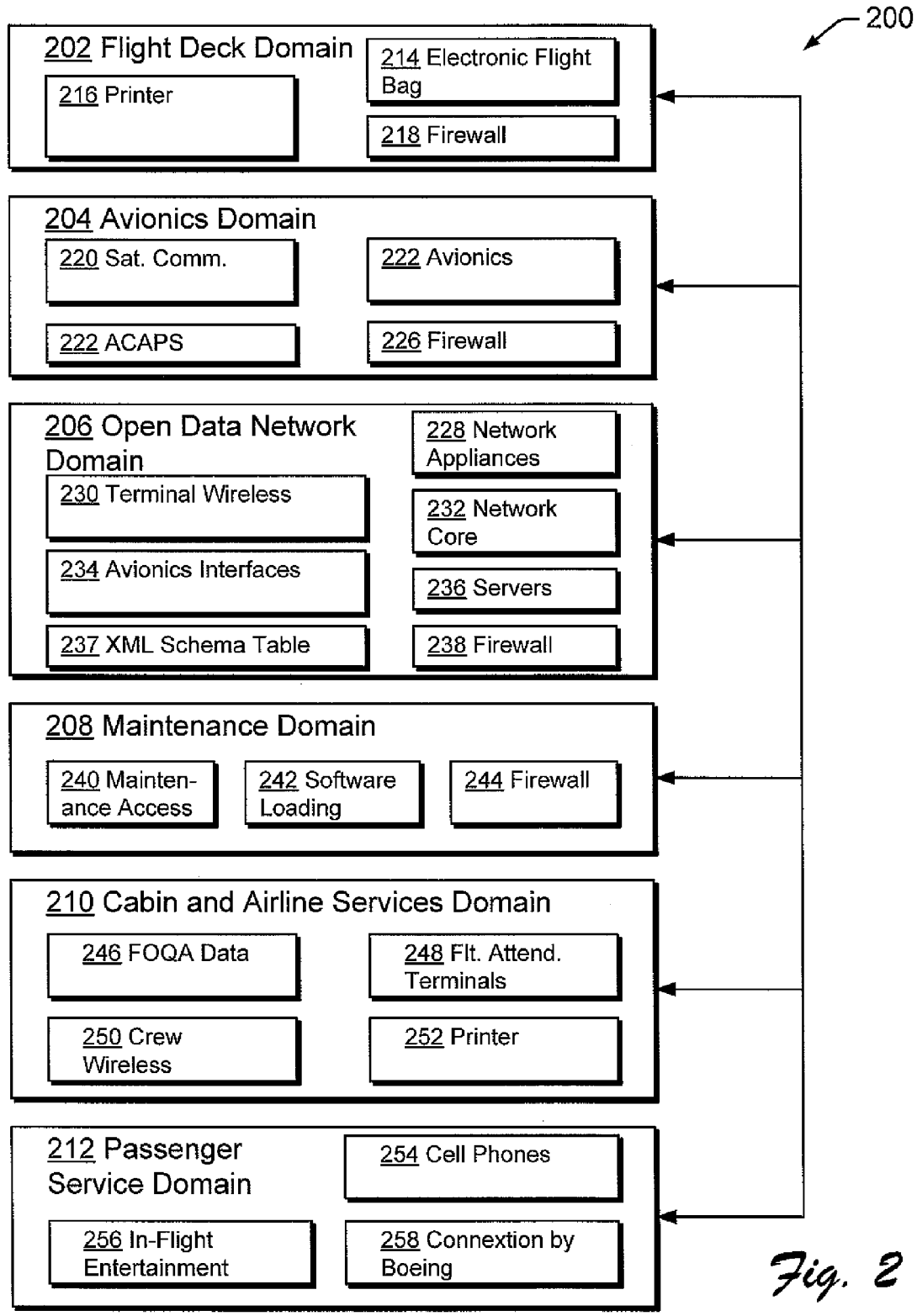
FIG. 2 illustrates an example of how various aircraft devices and systems can be organized by data type into various data network domains.

For purposes of command and instruction transmission, information and data sharing, and firewall organization, the diverse equipment groups located aboard the aircraft can be organized into several functionally compatible airplane data domains. The domains described below are representative of such domains, but are not necessarily required in the exact form described. Accordingly, in the embodiment shown in FIG. 1, the systems described include a common, COTS-based (commercial, off-the-shelf) framework to connect these various domains. In the example of FIGS. 1 and 2, this framework is provided by the open data network domain. It is envisioned that the domains described provide the necessary security and safety attributes, such as firewalls, cryptography and other technologies, as required.

FIG. 2 illustrates an example 200 of how various aircraft devices and systems can be organized by data type into various data network domains. In the example 200, a flight control domain 202 is configured to include equipment that pilots use to control the aircraft. An avionics data domain 204 includes avionic components and their respective data buses. An open data network domain 206 connects the various domains and the Internet. A maintenance domain 208 is configured to facilitate local and remote diagnosis, repair, monitoring and updating of on-board equipment. A cabin and airline services domain 210 is configured to provide control over non-critical aircraft control equipment not controlled by the avionics data domain 204. A passenger services domain 212 is configured to provide passengers access to the Internet through the open data network domain 206 and to provide telephone service within the aircraft.

A typical implementation of the flight control domain 202 includes network assets that are very complex and expensive. For example, the flight control domain 202 may include components and configurations that are not COTS-based. In an example of one such non-COTS-based component, an electronic flight bag (EFB) 214 is configured to provide a paperless cockpit with secondary display capabilities. Additionally, a printer 216 may be available and configured for use by flight control personnel. When adding connectivity between the flight control domain 202 and the Internet 112 (FIG. 1), it may be desirable to include detailed network security assessments and configurations, such as built-in network features (e.g. firewall 218) that prevents security violations. Such connectivity may be beneficial to maintenance activities performed on assets within the flight control domain 202. For example, maintenance of the control equipment of associated IO and communications equipment included in, or associated with, the flight control domain 202 can be facilitated by the network connection through the open networking data domain 206 to the Internet.

A typical implementation of the avionics data domain 204 includes avionics components and their respective data buses. Most of the assets in the avionics domain 204 are avionics equipment that are important or of high dispatch value, including complex assets such as satellite communication equipment 220, and avionics equipment 222 and ACAPS systems 224. Most of the avionic data domain 204 is not COTS-based, and development of equipment in this area may be relatively expensive. For example, while reading data from avionics buses is less problematic, writing to, and/or controlling such buses, can be more difficult. In some implementations of the avionics data domain 204, the major components for networking are the FMC for data uploading, the CMU for communicating off-board, and the CMC for accessing maintenance data. The domain is typically protected by a firewall 226.

The open networking data domain 206 provides connectivity to the various domains seen in FIG. 2, thereby enabling the transmission of data and instructions between the connected domains. In the example implementation of FIG. 2, the open networking data domain 206 includes connectivity and network security features. For example, the open data network domain 206 connects the flight control domain 202, the avionics data domain 204, the maintenance domain 208, the cabin and airline services domain 210, the passenger domain 212 and the Internet 112. In the embodiment of FIG. 2, the open networking data domain 206 employs COTS technology as appropriate. For example, the open networking data domain 206 is based on standard IP and Ethernet components, such as 802.11 wireless, cellular telephony, COTS computers, IP routers and switches, COTS firewalls, packet filters, and others.

The open networking data domain 206 can be connected continuously or intermittently to the global Internet 112 (FIG. 1) using any of several broadband or narrowband IP enabled communications services. The open networking data domain 206 can also be connected to terrestrial-based telecommunications or similar Internet systems. The open networking data domain 206 may be configured for connection to the avionics data systems and buses for both read-and-write communications. In one implementation, the open networking data domain 206 can provide IFE systems for hardwired Internet access to passengers in their seats. The open networking data domain 206 can also provide network appliances 228, terminal wireless 230, a network core 232, avionics interfaces 234, one or more servers 236 and typically a firewall 238. In some implementations, the open data network domain 206 is configured to access a table 237 identifying network assets, particularly wherein the table is configured based on an XML schema including an address and security attributes of each asset.

The open networking data domain 206 may support end-to-end Internet protocols and connections to Internet-based servers and services. Therefore, the open networking data domain 206 has built-in network security features to protect the safety critical devices from the network, thereby ensuring adequate security of passenger, air transportation and airline data. Moreover, the open networking data domain 206 may be configured to function and manage itself in a generally autonomous manner, given the likelihood of lost links and limited bandwidth to the Internet, particularly in airborne circumstances.

Continuing to refer to FIG. 2, a maintenance domain 208 includes components and/or connectivity required for maintenance personnel to diagnose, repair monitor and update (via software loading) on-board aircraft equipment. In many applications, the maintenance domain is additionally configured to allow a maintenance support base to send commands for the diagnosis, the repair, the monitoring and the updating of the on-board equipment for safety-critical functionality associated with pilot warnings and fault reporting from the Internet via the open data network domain 206. Thus, the maintenance support base may send commands and data via the open data network domain 206 to assets of the maintenance 208 domain to facilitate a self-test, a diagnostic or a problem correction.

In a first embodiment, maintenance personnel bring onto the aircraft their own computing equipment and data-loaders for attachment to the maintenance domain 208. In this configuration, data is exchanged directly with the maintenance domain 208, such as at a maintenance access point 240 for software and data-loading 242, In an alternative configuration, the computing equipment and data-loaders used by the maintenance personnel can access the maintenance data remotely. In this configuration, the data is exchanged with the maintenance domain 208 via the open networking data domain 206. Since the open networking data domain 206 is configured for Internet connectivity, the maintenance data can be accessed over the Internet. A firewall 244 can be used to protect the maintenance domain 208 from the Internet. The maintenance data and associated commands can be non-essential for flight (i.e. continued air-worthiness), but useful for aircraft dispatch. In an alternative embodiment, the data obtained over the maintenance network can include safety critical functions associated with pilot warnings and fault reporting.

Continuing to refer to FIG. 2, the cabin and airlines services domain 210 is included in some implementations. This domain includes equipment and associated functionality for the cabin crew (e.g. flight crew and flight attendants) to improve their performance. In one possible embodiment, the cabin and airlines services domain 210 is configured to provide control over non-critical control equipment not controlled by the avionics data domain. For example, the cabin and airlines service domain 210 may include non-essential equipment, such as lighting and similar cabin controls. Other embodiments may include some essential equipment. Alternatively or additionally, the cabin and airlines services domain 210 can include FOQA data 246, flight attendant terminals 248, crew wireless 250 and printers 252.

Continuing to refer to FIG. 2, a passenger services domain 212 includes passenger entertainment and business functions. All of these services are generally considered non-essential. In one example implementation, the passenger services domain 224 includes in-seat video and audio services, associated IFE equipment, on-board telephone systems and off-board broadband access to the Internet. In an alternative implementation shown in FIG. 2, the passenger services domain 212 includes typically passenger-owned cell phones 254, in-flight entertainment equipment 256, and communications systems 258, such as Connexion® by Boeing, an in-flight electronic communications service offered by The Boeing Company of Chicago, Ill., or other similar product.

In one embodiment, the on-board architecture components are organized into a small set of network domains that generally have fairly broad inter-connectivity and similar functionality. In the prior example embodiment, the small set of network domains included the flight control domain 202, the avionics data domain 204, the open networking data domain 206, the maintenance domain 208, the cabin and airlines services domain 210 and the passenger services domain 212. Table 1 provides additional description of the functions in these network domains, and provides an Open Data Network Component Overview.

TABLE 1

Figure 3:
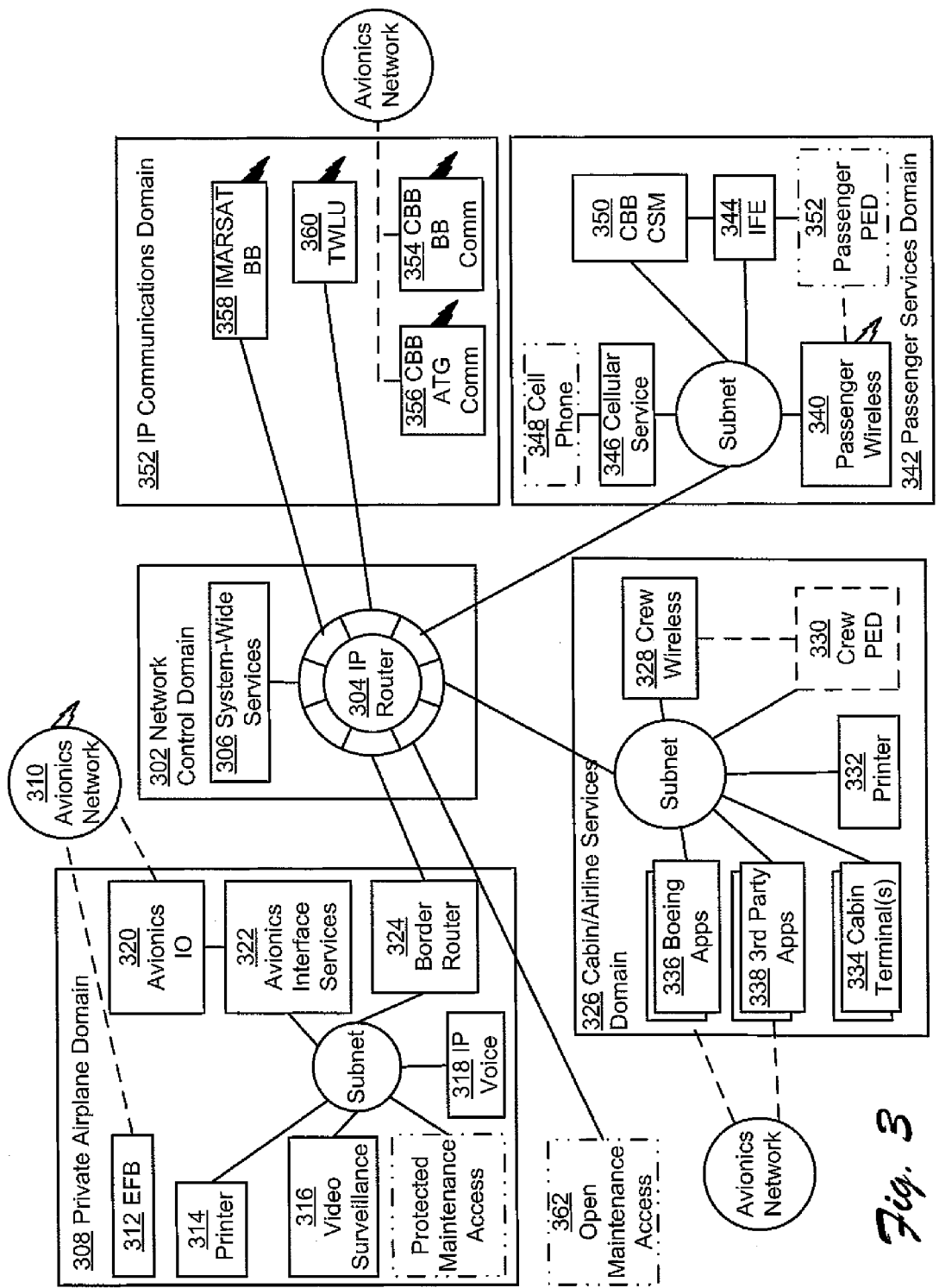
FIG. 3 illustrates a systems view showing an example of the on-board reference architecture, and particularly showing examples of individual domains.

Internal Hardware Components
  IP/Ethernet Switch Router
    Ethernet switch with many ports
    IP router with VLANs
    Functionally same as CN V2 EGM TABLE 1-continued Network File Server
    Application computing platform
    Computer with memory, HDD, etc.
    I/O services for Ethernet switch with dual NICs and limited avionics
    Functionally same as CN V2 EGM
  Avionics Interface
    Supports full ARINC 763 avionics IO (ARINC 429/17 & descretes)
    AFDX and other avionic bus interfaces
    Avionics data services
    Functionally same as CN V2 EGM
  Terminal Wireless
    Next generation TWLU (network enabled)
  Cabin Wireless
    Next generation CWLU (global and secure)
  Cabin IO device
    Mounted device for cabin crew, maintenance crew, IFE, etc.
    Portable wireless cabin crew devices
  IP Printer
    Ethernet ports and internal queue
  EFB
    Provides flight control IO and processing Part 25 and Part 21
    Class 2 and Class 3 supported
Software Components
  Network Services
    Automated network management
    Health & status monitoring and reporting
    IP services (DNS, DHCP, etc.)
    Airplane adaptation (COTS to 777/787)
    Packet filtering
    Firewalls
    Authentication services
  System and Component Services
    Common user interface
    Common airplane security paradigm
    Card level services
    Off-board messaging
    Common data-load services
    Electronic software delivery to airplane
External Devices (interfaced)
  IP enabled avionics
  e-Enabled IFE
  Broadband off-board IP communications
    CBB broadband in flight
    Inmarsat IP services (Swift 64, BGAN)
    CBB ATG air & ground
  IP enabled voice systems (wired and wireless)
  Factory IP/Ethernet/wired & wireless
  Data-loaders
    BEDS enabled devices
    DDM enabled devices
    Portable maintenance laptops FIG. 3 illustrates a systems view showing an example of the on-board reference architecture, and particularly showing examples of individual domains. A network control domain 302 is an implementation of the open data network domain 206 of FIG. 2, and provides functions and services necessary to host an autonomous IP data network. It provides the central network hub with Ethernet connectivity to network devices and is separate from the devices on the network. Example key components in the network control domain 302 include an IP router 304 and system-wide services 306. The IP router 304 provides Ethernet connectivity and IP routing and sub-netting capabilities. Sub-networking can be implemented using cascaded Ethernet switches or VLAN technology, as indicated by the security profiles and the physical architecture of a given implementation. The system-wide services 306 may be configured to provide services over the network to attached devices and applications. From a lower-level network perspective, the system-wide services 304 sets up and controls network configuration. It hosts network management and IP services for the entire network. Additionally, the system-wide services 304 is configured to provide services to map COTS (commercial, off-the-shelf products to the aircraft environment.

FIG. 3 also shows a private airplane domain 308. In a typical implementation, the private airplane domain 308 is controlled by an airplane manufacturer, and is a private sub-network on the airplane that contains functionality that is static and pertains to basic airplane operations. The private airplane domain 308 is located between the avionics networks 310 and the network control domain 302. The private airplane domain 308 may be physically enforced or virtually enforced. In one embodiment, the private airplane domain 308 is configured to include an electronic flight bag 312, a printer 314, video surveillance 316, IP voice 318, avionics IO 320, avionics interface services 322 and a boarder router 324.

With respect to the key components of a private airplane domain 308, the electronic flight bag 312 is a flight deck (e.g. flight control) system that hosts part 25 and operationally approved applications and has flight crew and avionics data interfaces. A version of the printer 314 is a flight deck avionics grade network aware device. A version of the video surveillance is a system that provides security video to the flight crew. IP Voice 318 is a voice over IP service for the flight deck. Avionics IO 320 provides data conversion services to convert airplane bus protocols to IP. The avionics IO 320 may support ARINC 717, ARINC 429 and AFDX IO protocols and may have built-in features to electrically isolate the open network(s) from the avionics equipment and buses. An avionics interface service 322 provide read-only and read-write data access for networked devices and applications. The avionics interface service 322 provides standard airplane parameters to allow fleet-wide software re-use and supports necessary built-in security features to protect the avionics buses logically. A boarder router 324 provides IP communications and isolation between the private airplane network 308 and the network control domain 302. The boarder router 324 uses COTS IP tools to perform packet filtering and point-to-point routing.

FIG. 3 also shows a cabin and airline services domain 326. The cabin and airline services domain 326 provides functionality for the airline's cabin crew. This functionality provides electronic computing and connectivity to reduce cabin crew workload and to increase passenger comfort. In one embodiment, the cabin and airline services domain 326 is typically configured to include crew wireless system 328, cabin crew PEDs 330, a printer 332, a cabin terminal 334, an application server 336 (e.g. provided by an aircraft manufacturer) and a third party server 338. With respect to the key components of a cabin and airline services domain 326, an implementation of the crew wireless 328 is configured to include 802.11 COTS-based wireless devices, with settings modified for operation inside the airplane. These devices allow cabin crew devices to connect the network control domain 302 and to prevent non-approved devices from attaching to the network. The crew wireless system 328 may share hardware with the passenger wireless devices 340, depending on security requirements. The cabin crew PEDs 330 may be airline-owned laptops and personal electronic devices that the cabin crew uses to attaching them to the network. They may have any and/or all functionality of known computing devices. A version of the printer 332 has functionality similar to the flight deck printer, but is located in the cabin. It may be connected directly to the network control domain 302, as shown, or indirectly via the IFE network. A cabin terminal 334 is a hardwired TO device in the cabin that is used by the cabin crew and/or maintenance personnel. The cabin terminal(s) 334 may be part of an IFE system or they may be standalone devices. The application server(s) 336 are computing platforms that host a manufacturer-supplied applications and/or services. The third party server(s) 338 are computing platforms that host airline and/or third party applications and/or services. Server(s) 336, 338 may be logically the same, but may have different privileges and/or certification bases.

FIG. 3 also shows a passenger services domain 342. The passenger services domain 342 provides services for passenger entertainment and in-flight business. These are all non-essential components. In one embodiment, key components of the passenger services domain 342 include an in-flight entertainment system 344, a passenger wireless system 340, a cellular services system 346 including passenger-owned cell phones 348, a CBB CSM system 350 and a system for passenger-owned personal electronic devices (PED) 352. With respect to the key components of a passenger services domain 342, an implementation of the in-flight entertainment system 344 provides seat-back entertainment to the passengers. The system 344 may include audio and visual services as well as an IP port and power for PCs and other passenger devices. A version of the passenger wireless system includes 802.11 COTS-enabled wireless devices with settings modified to operation inside the airplane. These devices allow open communication to passenger owned laptops and personal electronic devices. In one implementation, these devices will not be connected to the network control domain 302, but are attached to a broadband service provider and routed across the domain. The passenger wireless system 340 may share hardware with the crew wireless devices, depending on security requirements. A version of the cellular service is a system that provides on-board cellular services for major protocols using Pico-cell equipment stations, which have been qualified for in-airplane use. Voice and data are carried over the network control domain 302 for this service. In this environment, cell phones are passenger-owned and are attached to the cellular service system 346 in a low-power mode. An implementation of the CBB CSM system 350 is a collection of network and passenger services required to support on-board CBB services. The system 350 is primarily associated with off-board broadband access to the Internet. These services may be directly connected to CBB off-board broadband communications systems and provide firewalls and protection to the network control domain 302.

FIG. 3 also shows an IP communications domain 352, which in one embodiment is configured as a collection of similarly functional systems that do not interoperate. The similarly functional systems provide off-board broadband IP services for passenger and devices on the open data network domain 302. Components of the IP communications domain 352 may include a CBB broadband communications system 354, a CBB ATG communications system 356, an Inmarsat broadband communications system 358 and a TWLU system 360. A version of the CBB broadband communication system 350 uses satellite communications radios and modems to connect via Ku-band satellites to the global Internet via CBB ground-based gateways. A version of the CBB ATG communications system 356 uses 3 G cellular technology and equipment to route on-board open data domain network and voice traffic to the global Internet and telecommunications systems via CBB ground-based gateways. A version of the Inmarsat broadband communications system 358 uses satellite communications radios and modems to connect via L-band satellites to the global Internet via one of several ISP (Internet service provider) owned ground-based gateways. A version of the TWLU system 360 is an 802.11 ground-based system that provides IP connectivity to an airplane at the airport gate.

FIG. 3 also shows a maintenance access domain 362. In one implementation of the maintenance access domain 362, a plurality of access ports for maintenance personnel are provided. The ports allow attachment of ground based equipment to the network, such as a Maintenance Laptop, which may be an airline-owned PC or similar. Alternatively, the domain 362 is configured to allow access to addressable maintenance assets on the aircraft networks remotely via, for example, the IP communications domains. In one implementation, there are two classes or maintenance access. A first class is open and relies on network security and authentication for access to limit or restrict interconnectivity beyond what is described above.

Network edge devices are responsible for ensuring appropriate addressing and security is in place between the off-network devices and devices on the network.

Table 2 shows the on-board technical view depicting components and the relationship as layered services.

| Architecture Layers with Services | | | | | | | |
|---|---|---|---|---|---|---|---|
| Applications | Passenger Broadband Applications | Boeing (Mfg.) Cabin Applications | Voice Services | Flight Operations Applications | | Maintenance Applications | Airline Applications |
| Local Services | Integration Services | Application Security Serve | Card Level Services | Resource Management | Software Loading | Data Services | Functional Services |
| System-Wide Services | Network Management | | IP Services (DHCP, DNS, NAT) | Packet Filtering/ Firewalls | Avionics Interface Services | | Airplane Adaptation |
| | Communications Services | | System Resource Mgmt. | Network Security Services | Electronic Data Delivery | | Electronic Software Delivery |
| Low-Level Services | Ethernet | IP Protocols | IP Routing | IP Addressing | Linux OS | Windows OS | IO Device Drivers |
| Physical Packaging | Airbus AFIS | Core Network V1/V2 | | Component Based e-Enabled | CBB ATG | Next Gen Integrated Modular | Other CBB Exchange | and protection. A second class is physically protected and allows working around the network security and authentication procedures when they are not functioning properly.

FIGS. 3 through 7 illustrate a number of component relationships. Components communicate using a variety of protocols and at various layers in protocol stacks. For one embodiment of the architecture, the inter-component communication discussions are limited to lower-level protocols, as opposed to on-board application level software interactions. In some implementations of the lower level, much emphasis has been placed on using COTS communications mechanisms.

A primary communications medium that may be used is Ethernet. This is completely COTS standard and supports COTS IP protocols riding over it. Avionics data buses are attached to the open data network domain (ODN in the figures) and connect multiple avionics devices together using either read-only buses, such as the ARINC 717 bus, and read-write buses, such as the ARINC 429 buses. In one implementation, AFDX avionics buses are forms of deterministic Ethernet, which can be fiber-optic based. Another medium is the wireless networking access based on 802.11 protocols, which provide on-board connectivity to end devices and off-board connectivity to the airport wireless at the gate.

Figure 4:
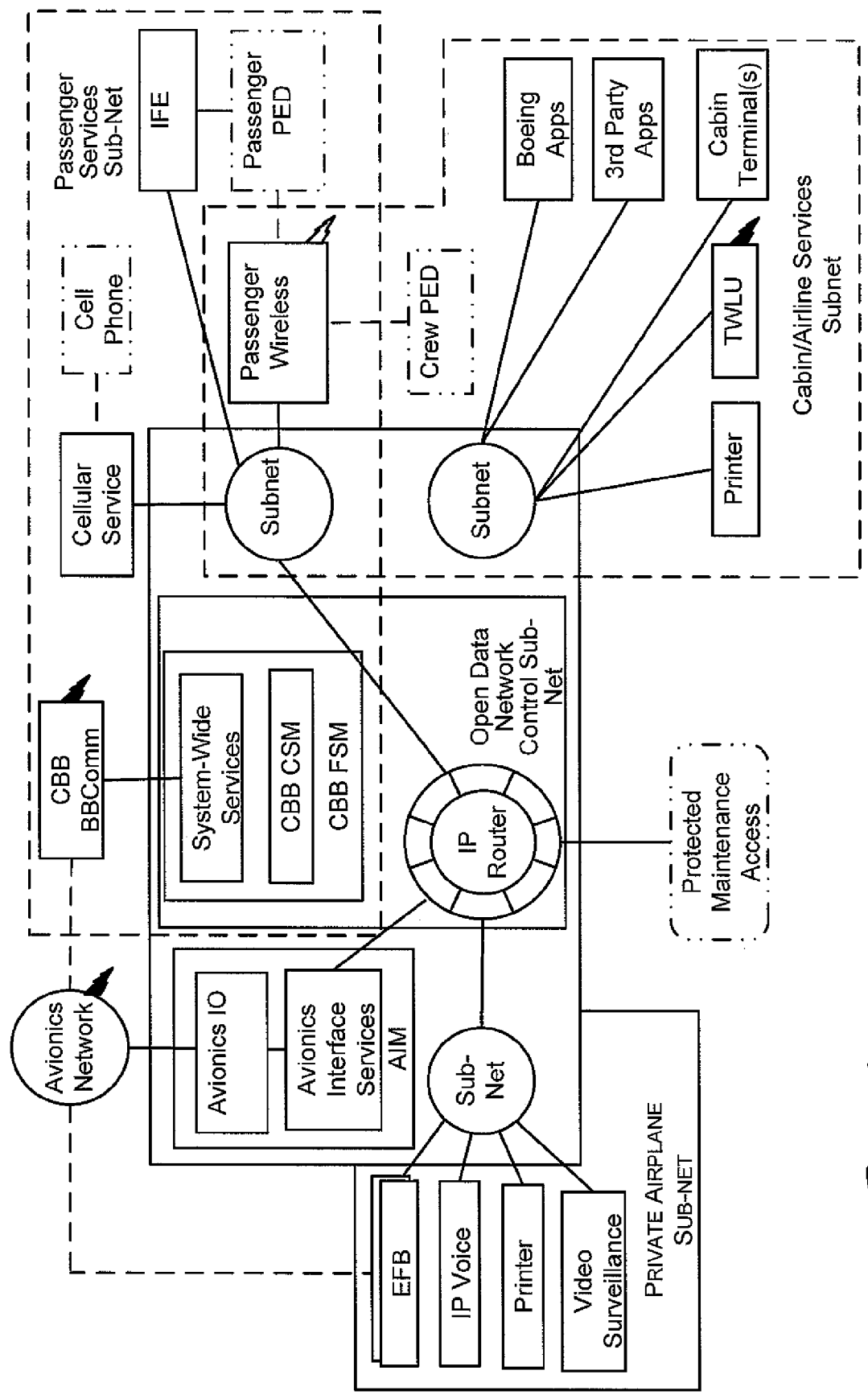

The devices on the open data network domain (labeled ODN in FIGS. 4-6) may be logically connected to each other, but may be separated into sub-networks. Each sub-network has full IP connectivity to each device on the network. Inter-sub-network communication may be allowed only between devices that have programmed into the access control lists, or used to limit or physical routers as the implementation dictates. In one embodiment, application level features are used FIGS. 4 through 7 illustrate the flexibility of the teachings herein disclosed by showing alternative embodiments of the network architecture discussed, which represent others not shown but easily envisioned in view of those disclosed. In particular, FIG. 4 illustrates an example wherein a network architecture according to FIGS. 1-3 or similar is retrofit to an existing core network adapted for a twin aisle implementation. Thus, FIG. 4 shows mapping from a reference architecture to a typical electronic communication system, such as the Connexion® by Boeing (CBB) retrofit Core Network V1 based implementation. Non-electronic communication system (e.g. Non-CBB) and Core Network equipment are also shown in FIG. 4, which shows component locations and connectivity in accordance with one possible embodiment of the invention. From a computing and networking perspective, the components may be configured in the Core Network V1 chassis.

Figure 5:
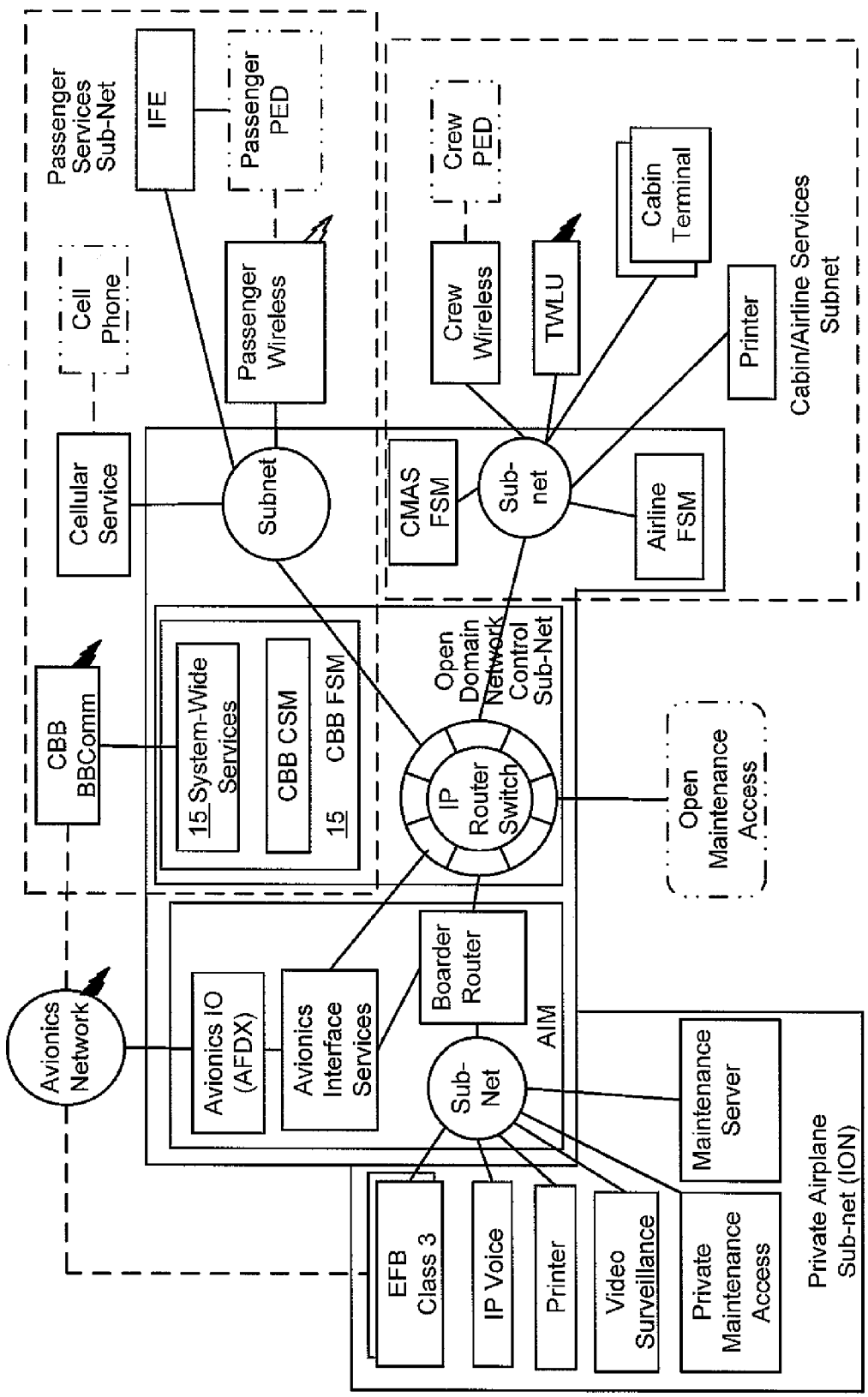

FIG. 5 illustrates an example wherein a network architecture according to FIGS. 1-3 or similar is retrofit to an existing core network adapted for a commercial aircraft, such as the Boeing 787 commercial aircraft commercially available from The Boeing Company. In particular, FIG. 5 shows mapping from the Reference Architecture to a typical Core Network V2 based implementation. Basic equipment is shown to illustrate the implementation. The diagram shows connectivity and locations of components. From a computing and networking perspective, most of the components may be in the Core Network V1 chassis.

Figure 6:
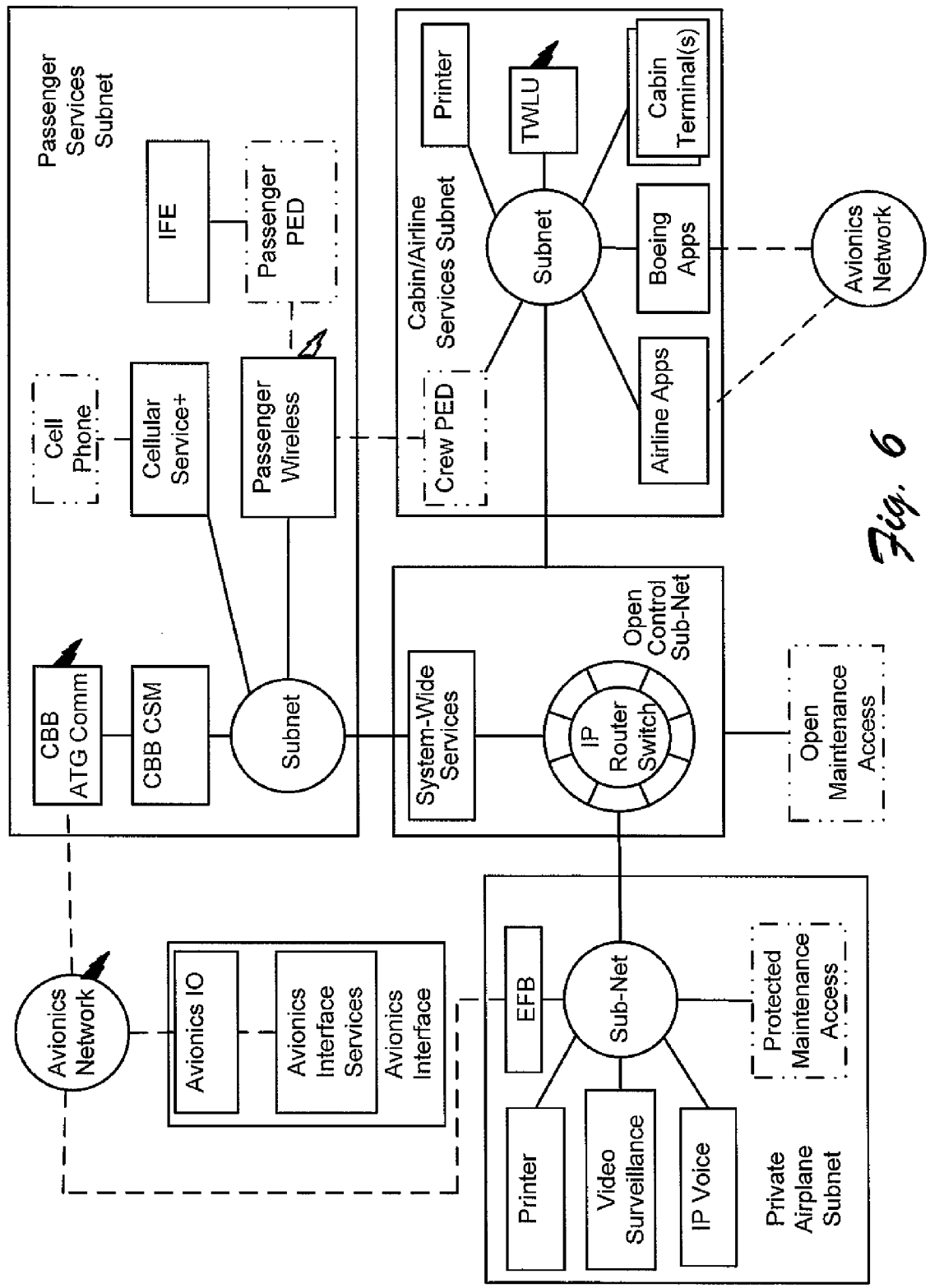

FIG. 6 illustrates an example wherein a network architecture according to FIGS. 1-3 or similar is retrofit to an existing core network adapted for a single aisle component based implementation. In particular, FIG. 6 shows mapping from the Reference Architecture to a typical communications system and e-Enabled production or retrofit component based implementation. The drawing of FIG. 6 illustrates what a 737 ARINC 600 component-based solution could look like. The diagram shows connectivity and location of components. From a computing and networking perspective, key components are the NFS, which hosts applications, and the open data network domain controller that is the "core" of the network.

Figure 7:
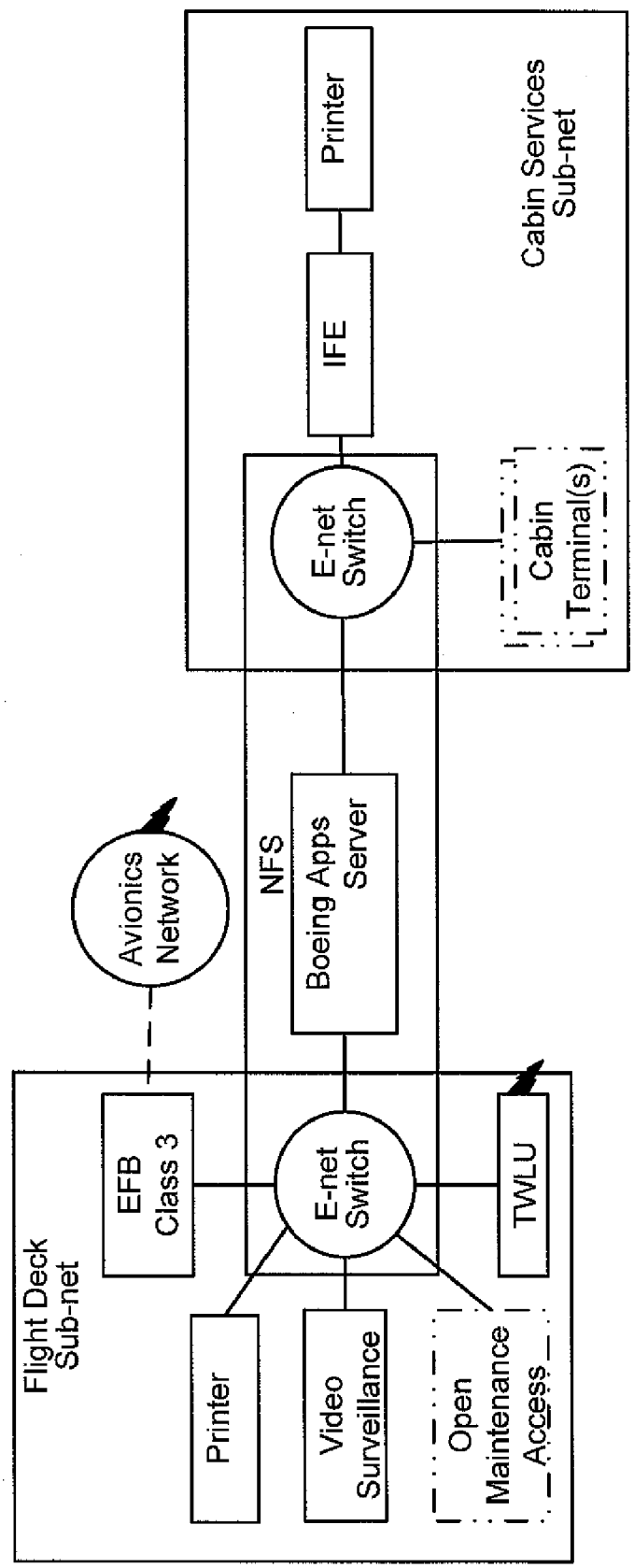

FIG. 7 illustrates an example wherein a network architecture according to FIGS. 1-3 or similar is retrofit to an existing core network adapted to a single LRU implementation. This example implementation uses a single NFS LRU for networking, routing, separating dual sub-networks, network management, avionics IO, and application processing. This implementation is most advantageous where the network and airline applications are of limited scope. In one embodiment, utilization of the Boeing Class 2 EFB takes on most of the network management, network services, network security, application computing, and device management functions for the entire on-board network.

Figure 8:
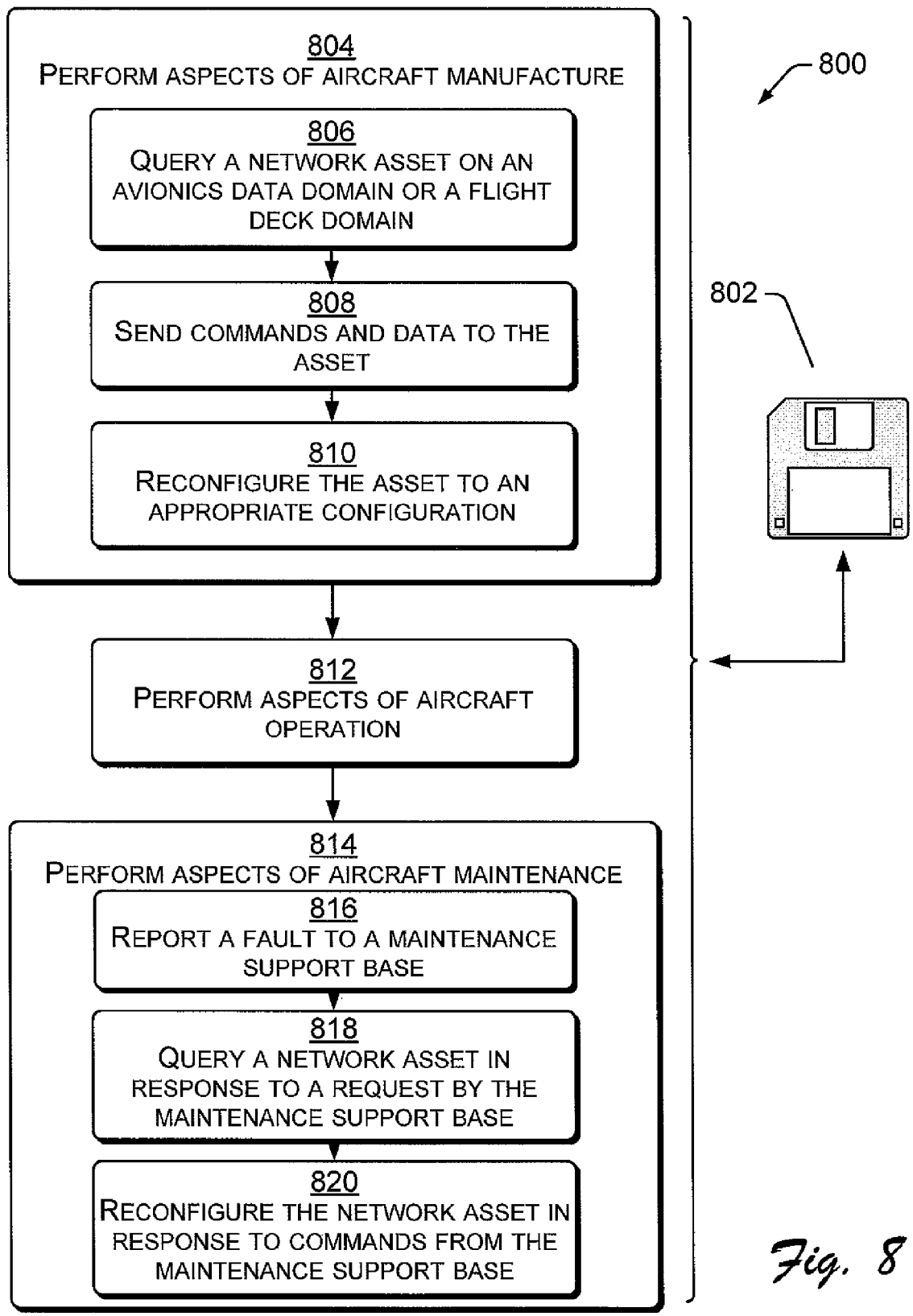
FIG. 8 illustrates an example method by which data can be managed in an aircraft environment in accordance with an embodiment of the invention.

FIG. 8 illustrates an example method 800 by which data can be managed in an aircraft environment. The method 800 may be performed by computer executable instructions contained on a computer readable media 802 of any type. At block 804, aspects of aircraft manufacture are performed, such as by communicating with assets via an open data network domain. An example of the operation of block 804 may be understood with brief reference to FIG. 2, wherein the system 200 is configured to allow communication with assets via an open data network domain 206, such as during manufacturing, operation and/or maintenance of an aircraft.

Referring again to FIG. 8, blocks 806-810 teach one example implementation of the aspects taught by block 804. At block 806, a network asset on an avionics data domain or a flight control domain is queried. Referring again to FIG. 2 for an example of a structure operable as disclosed by block 806, a network asset could be any of those listed with respect to the avionics data domain 204 or the flight control domain 202. At block 808, commands and data are sent to the asset. Referring again to FIG. 2 for a specific example, it can be seen that the commands could be sent to network assets over the open networking domain 206, which provides an Internet connection. Accordingly, the commands and data sent to/from the network asset could be sent by engineers or technicians in any location. At block 810, the asset is reconfigured to an appropriate configuration. In the manufacturing, operational and/or maintenance modes, it can be important to reconfigure an asset to an appropriate configuration. In a simple example, this may involve "resetting", "rebooting" or reprogramming a component asset on a network.

At block 812, aspects of aircraft operation are performed. Referring again to FIG. 2, an example of the aspects of aircraft operation can be understood. In this example, data is sent between the flight control domain 202 and the avionics data domain 204 through the open data network domain 206. The flight control domain 202 provides connectivity to equipment used by pilots to control the aircraft. The avionics data domain 204 provides connectivity facilitating interface to avionic components critical for operation of the aircraft. These two domains 202, 204 interact to allow the pilot(s) to control the aircraft. Communications between the domains 202, 204 is provided for by the open data network domain 206.

Figure 9:
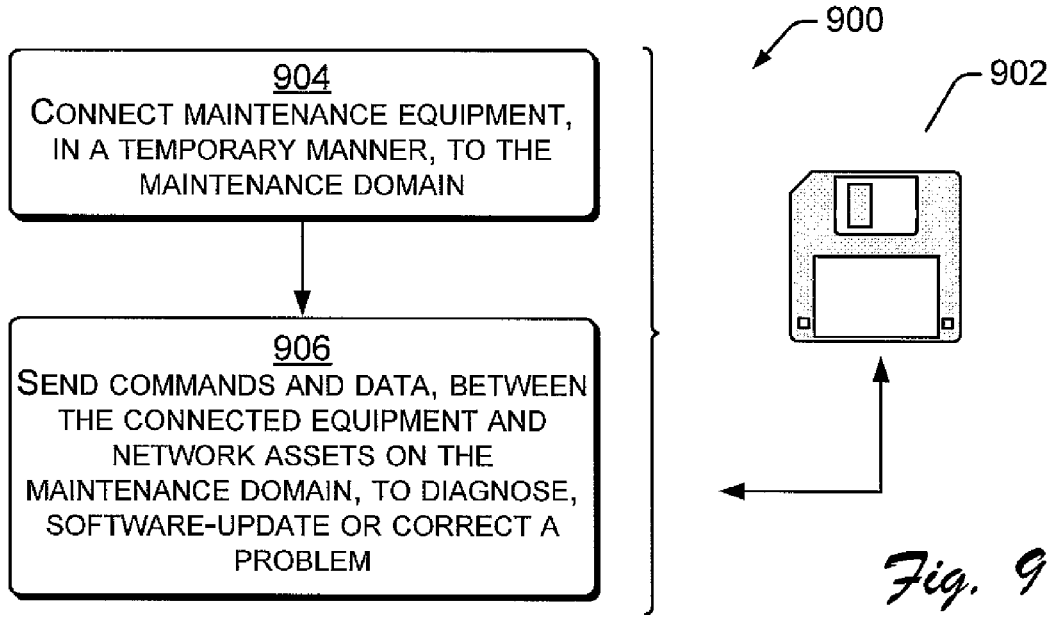
FIG. 9 illustrate an alternative method by which aspects of aircraft maintenance may be performed.

At block 814, aspects of aircraft maintenance are performed. Such aspects of maintenance may be performed while the mobile transportation unit is stationary, in motion, on the ground or in the air. Blocks 816-820 teach one example implementation of the aspects taught by block 814, while FIG. 9 shows a second example implementation. In the example implementation of block 814, the maintenance may be performed at least in part from a remote location. At block 816, a fault is reported to a maintenance support base. Such a maintenance support base can be one example of the airline maintenance indicated at 110 in FIG. 1. At block 818, a network asset is queried in response to a request by the maintenance support base. Typically, the network asset queried is having the reported fault, or associated with an asset that is having the fault. At block 820, the network asset is reconfigured in response to commands from the maintenance support base. As seen earlier, the maintenance support base can be located remotely, and the commands sent to the asset over the Internet via the open networking domain 206.

FIG. 9 illustrate an alternative method 900 by which aspects of aircraft maintenance may be performed. Thus, blocks 904-906 of FIG. 9 provide an alternative to blocks 816-820 of FIG. 8. The method 900 may be performed by computer executable instructions contained on a computer readable media 902 of any type. At block 904, in a temporary manner, maintenance equipment is connected to the maintenance domain. In the example of FIG. 2, the maintenance access port 240 allows maintenance workers to connect maintenance equipment to the maintenance network. This is in contrast to the method of blocks 816-820, wherein access is performed remotely, such as over the Internet. At block 906, commands and data are sent between the connected maintenance equipment and network assets on the maintenance domain. The commands and data allow maintenance workers to diagnose, software-update, and/or correct a problem with a network asset.

Figure 10A:
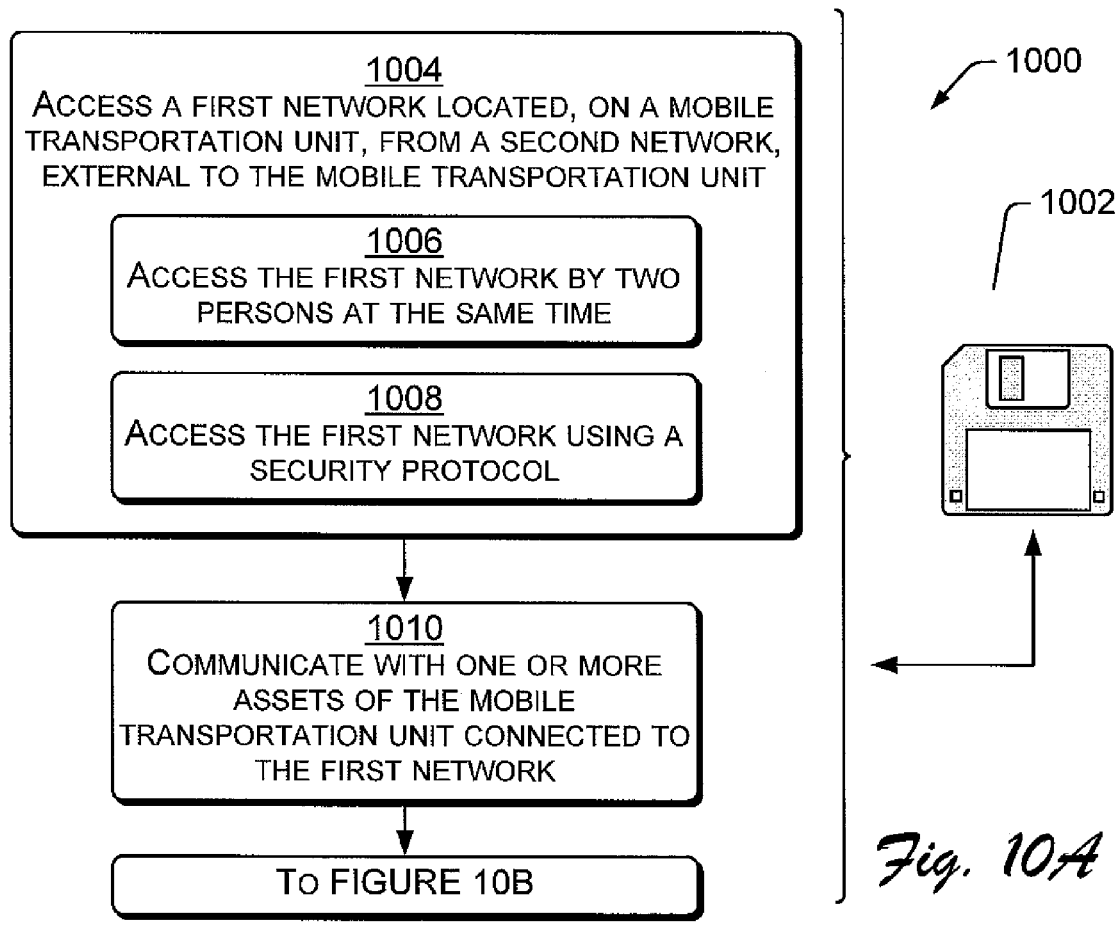
FIG. 10 illustrates an example method by which maintenance operations may be remotely performed on a mobile transportation unit.
Figure 10B:
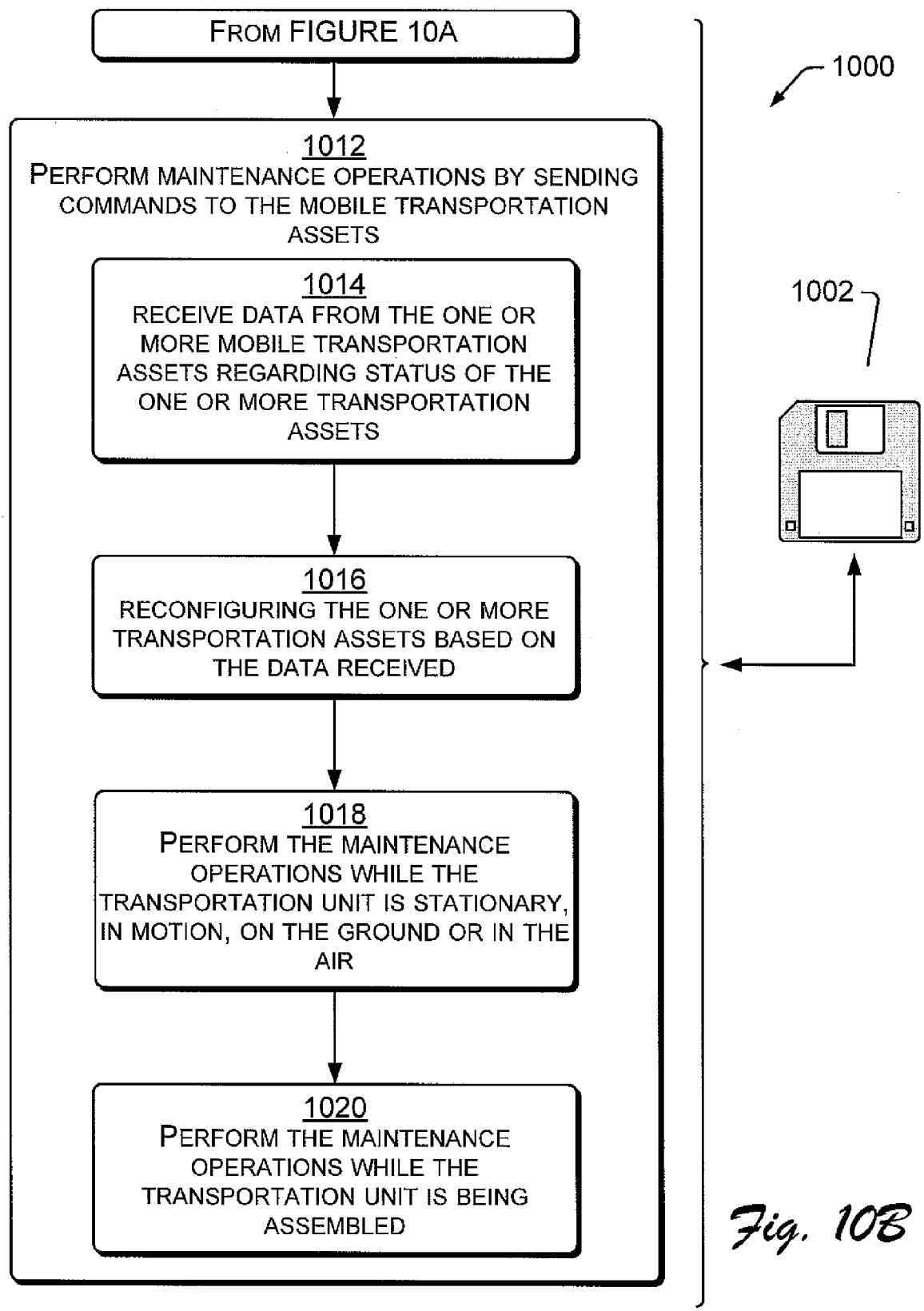

FIG. 10 illustrates an example method 1000 by which maintenance operations may be remotely performed on a mobile transportation unit, such as an aircraft. The method 1000 may be performed in part by operation of computer executable instructions contained on a computer readable media 1002 of any type. At block 1004, a first network, located on a mobile transportation unit, is accessed from a second network external to the transportation unit. The implementation of FIG. 2 provides an example of the operation of block 1004. The mobile transportation unit may be an aircraft, wherein the functionality of the first network may be performed by the maintenance domain 208. The functionality of the second network may be performed by the open networking domain 206, or by the Internet 112 (see FIG. 1) to which the domain 206 is in communication. Blocks 1006-1008 provide optional implementations of block 1004. In particular, at block 1006, the first network is accessed by two or more personas at the same time. In the example of FIG. 2, the maintenance domain can be accessed by a plurality of maintenance personnel. The maintenance personnel can be located remotely, such as at any location(s) having an Internet connection. At block 1008, access to the first network is restricted by a security protocol which allows only authorized persons to gain access to the first network (e.g. the maintenance domain 206). The security protocol can be any COTS-based or proprietary protocol desired.

At block 1010, communication is established with one or more assets of the mobile transportation unit. In one implementation, the assets are on the maintenance network 208 of the mobile transportation unit, and communication is established from a remote location on the Internet after negotiating the security protocol of the maintenance domain 208.

At block 1012, maintenance operations are performed by sending commands and/or exchanging data with the assets of the mobile transportation unit. In the example implementation of FIGS. 1 and 2, the commands are optionally sent over the Internet 112 and the maintenance domain 208, and are able to access any aircraft component, such as those on the flight control domain 202, the avionics domain 204 or other location. Blocks 1014-1020 disclose example aspects that may be part of the implementation of block 1012 and FIG. 10. At block 1014, data is received from one or more assets of the mobile transportation unit regarding the status and/or configuration of the one or more assets. The configuration can include any settings, programming or other aspects that may be configured locally or remotely. At block 1016, the one or more assets are reconfigured based on the data received. Accordingly, the settings, programming or other aspects of the assets' configuration or maintenance can be maintained from a remote location. At block 1018, the maintenance operations can be performed while the transportation unit is stationary or in motion, whether on the ground or in the air. At block 1020, the maintenance operations can be performed while the transportation unit is being manufactured. Thus, aspects of the programming settings, configuration and other elements of the manufacturing process can be performed remotely.

While preferred and alternate embodiments of the invention have been illustrated and described, as noted above, many changes can be made without departing from the spirit and scope of the invention. Accordingly, other variations of network architectures and communications networks will be readily apparent to those of skill in the art. Therefore, the scope of the invention is not limited by the disclosure of these preferred and alternate embodiments. Instead, the invention should be determined entirely by reference to the claims that follow.

What is claimed is:

1. A method to perform maintenance operations on one or more assets of a mobile transportation unit, comprising:
   accessing a first network located on the mobile transportation unit from a terminal on a second network external to the mobile transportation unit wherein
      the first network provides connectivity between multiple systems on the mobile transportation unit which operate according to disparate communication protocols, and
      the second network is a ground-based network;
   establishing a communication connection between the terminal on the second network and at least one of the one or more assets of the mobile transportation unit connected to the first network, wherein the communication connection enables the terminal to communicate directly with the at least one of the one or more assets of the mobile transportation unit; and
   performing maintenance operations by sending commands from the terminal directly to the one or more assets, wherein:
      the first network comprises an open networking data domain which provides connectivity to multiple networking domains aboard the mobile transportation unit; and
      the open networking data domain maintains a table identifying network assets, wherein the table is configured based on an XML schema including an address and security attributes of each asset, and the open networking data domain utilizes address information from the table to enable establishing a communication connection between the terminal on the second network and at least one of the one or more assets of the mobile transportation unit.

2. The method of claim 1, wherein:
the mobile transportation unit is an aircraft;
the first network is coupled to a maintenance domain; and
the second network is the Internet.

3. The method of claim 1, wherein accessing the first network comprises using a security protocol configured to allow only authorized persons to access the first network.

4. The method of claim 1, wherein accessing the first network comprises one or more persons accessing the first network at the same time to perform maintenance operations on the mobile transportation unit.

5. The method of claim 1, wherein performing the maintenance operations comprises maintenance performed while the mobile transportation unit is stationary, in motion, on the ground or in the air.

6. The method of claim 1, wherein performing the maintenance operations is done while the mobile transportation unit is being assembled.

7. The method of claim 1, wherein performing the maintenance operations comprises:
   receiving data from the one or more assets of the mobile transportation unit regarding status of the one or more assets; and
   reconfiguring the one or more assets based on the data received.

8. The method of claim 1, wherein the open networking data domain comprises an internet protocol (IP) router.

9. The method of claim 1, further comprising:
   receiving, in a remote maintenance support base, a report of a fault in one or more assets of the mobile transportation unit; and
   launching, in the remote maintenance support base, a query to the one or more assets of the mobile transportation unit which generated the fault.

* * * * *